(12) United States Patent　(10) Patent No.: US 12,519,300 B2
Xu　(45) Date of Patent: Jan. 6, 2026

(54) DATA CABLE REEL AND CHARGING DATA CABLE THEREFOR

(71) Applicant: ShenZhen JuXingZhe Technology CO., LTD, Shenzhen (CN)

(72) Inventor: Huabiao Xu, Shenzhen (CN)

(73) Assignee: ShenZhen JuXingZhe Technology Co., Ltd, Shenzhen (CN)

( * ) Notice: Subject to any disclaimer, the term of this patent is extended or adjusted under 35 U.S.C. 154(b) by 119 days.

(21) Appl. No.: 18/430,768

(22) Filed: Feb. 2, 2024

(65) Prior Publication Data

US 2024/0170938 A1　May 23, 2024

Related U.S. Application Data

(63) Continuation of application No. PCT/CN2022/092811, filed on May 13, 2022.

(30) Foreign Application Priority Data

Jun. 2, 2021　(CN) .......................... 202121226745.1

(51) Int. Cl.
*H02G 11/02*　(2006.01)
*B65H 75/44*　(2006.01)
*H01B 9/00*　(2006.01)

(52) U.S. Cl.
CPC ......... *H02G 11/02* (2013.01); *B65H 75/4428* (2013.01); *H01B 9/003* (2013.01)

(58) Field of Classification Search
CPC ................ H02G 11/02; B65H 75/4418; B65H 75/4428; B65H 75/4434
See application file for complete search history.

(56) References Cited

U.S. PATENT DOCUMENTS

| | | | | |
|---|---|---|---|---|
| 4,989,805 | A * | 2/1991 | Burke | B65H 75/44 242/378.2 |
| 6,019,198 | A * | 2/2000 | Nielsen | B65H 75/4434 188/31 |
| 2011/0061982 | A1* | 3/2011 | Cheng | H02G 11/02 191/12.2 R |
| 2018/0269672 | A1* | 9/2018 | Ebrahimi Afrouzi | B65H 75/4471 |

* cited by examiner

*Primary Examiner* — Sang K Kim
(74) *Attorney, Agent, or Firm* — JEEN IP LAW, LLC (57) ABSTRACT

Disclosed is a data cable reel, comprising a housing, a winding wheel mechanism and a winding control mechanism. The winding wheel mechanism comprises a take-up drum, a drum center shaft and a rotating spring, and the rotating spring drives the drum center shaft to rotate so as to take up a cable; the winding control mechanism comprises a main rotating member, a swinging member engaged with the main rotating member, a first control member which controls the movement of the swinging member, and a second control member which starts the movement of the swinging member; the swinging member and the first control member are rotatably connected to the take-up drum or the housing, and the second control member is fixed on the take-up drum or housing.

9 Claims, 9 Drawing Sheets

DATA CABLE REEL AND CHARGING DATA CABLE THEREFOR

CROSS REFERENCE TO THE RELATED APPLICATION

The present application claims the right of priority to the Patent Application No. PCT/CN2022/092811 filed on May 13, 2022, and entitled "Data Cable Reel and Charging Data Cable Therefor", which is incorporated in its entirety herein by reference.

TECHNICAL FIELD

The present disclosure belongs to the technical field of electronic apparatus charging, and relates to a data cable reel and a charging data cable therefor.

BACKGROUND

For convenience of using existing data cables, a long data cable is generally used in long-distance connection cases. However, the data cable is likely to get twisted when it is not used, which may cause damage of the data cable. The data cable needs to be untwisted before it is used later, which is very troublesome. Storage of the existing data cable is achieved with a storage device. There is a kind of storage device, which requires manual winding. When the data cable stored in the device is used, it has to be completely pulled out, which is very troublesome to store. There is another kind of reel for automatic storage. It is internally provided with a winding spring. After a data cable is pulled out, the winding spring is compressed. When pulling is stopped, the data cable is wound on the reel through an elastic force of the winding spring. In order to lock the pulled data cable, a locking mechanism is used to stop the retracted data cable and prevent the data cable from being retracted. However, this mechanism cannot achieve cable pulling at any length and can only position the data cable at certain set lengths.

Similarly, an existing charger also has a defect of data cable storage, which needs to be solved.

SUMMARY

In order to overcome defects in the prior art, the present disclosure aims to provide a data cable reel and a charging data cable therefor. The data cable reel does not limit a pulling length, and enables a data cable to be pulled and stopped at any moment, which is convenient.

In order to solve technical problems, the present disclosure uses the following technical solutions:

a data cable reel includes a housing, where the housing is internally provided with a winding wheel mechanism and a winding control mechanism;

the winding wheel mechanism includes a take-up drum, a drum center shaft, and a rotating spring arranged in the drum center shaft, where the rotating spring drives the drum center shaft to rotate so as to take up a cable;

the winding control mechanism includes a main rotating member fixedly connected to the winding wheel mechanism and directly driving the winding wheel mechanism to rotate, a swinging member engaged with the main rotating member, a first control member controlling movement of the swinging member, and a second control member starting movement of the swinging member;

the swinging member and the first control member are rotatably connected to the take-up drum or the housing, and the second control member is fixed on the take-up drum or the housing;

the swinging member is provided with a motion path, the first control member is used in the motion path in a matching manner, the swinging member is controlled to rotate and stop according to a shape of the motion path and a position of the first control member in the motion path; and the swinging member elastically abuts against or is elastically connected to the second control member when the swinging member stops, and the movement of the swinging member is started through an elastic force of the second control member.

Further, the motion path is a path recess formed on the swinging member, the path recess is a closed ring recess or a non-closed ring recess, and the first control member slides in the path recess in a matching manner; and the first control member is a rotating plate rotatably connected to the take-up drum or the housing. A front end of the rotating plate is provided with a convex column. The convex column slides in the motion path in a matching manner.

Further, in the data cable reel, preferably, the path recess is provided with at least four fixed corners configured to stop the first control member, the other parts of the path recess are non-obstacle slideways. Correspondences of the four fixed corners are as follows: corner 1, corner 2 and corner 4 correspond to the condition that the swinging member rotates to be in a non-engaged state with the main rotating member, and corner 3 corresponds to the condition that the swinging member rotates to a middle position and is in an engaged state with the main rotating member.

Further, the second control members are arranged in a pair and are located at rotation limiting points on two sides of the swinging member. When the swinging member rotates to the rotation limiting point, the swinging member is disengaged from the main rotating member and elastically abuts against the second control members.

Alternatively, the second control member is fixed on one side of the swinging member and connected to the swinging member. When the swinging member rotates to a rotation limiting point, the swinging member is disengaged from the main rotating member, and the second control member is elastically compressed.

The second control member is an elastic shifting block made of plastic or metal having certain resilience.

Further, in the data cable reel, preferably, the main rotating member is a gear coaxially fixed on the drum center shaft. The swinging member is a sector gear. A front end of the swinging member is provided with a section of engaging teeth engaged with the main rotating member. A rear end of the swinging member is rotatably connected to the take-up drum or the housing.

Further, the main rotating member is an open-end disc coaxially fixed to the drum center shaft. The open-end disc is provided with at least one toggle notch. The swinging member is sectorial. A front end of the swinging member matches the toggle notch of the open-end disc. A middle portion of the swinging member is rotatably connected to the take-up drum or the housing.

Further, the second control member is a spring. One end of the spring is fixed on the swinging member or the main rotating member. The other end of the spring is fixed on the take-up drum or the housing. The second control member is separately arranged on one side of the swinging member.

Further, one side of the swinging member opposite the path recess is provided with a sector gear structure. The swinging member is rotatably connected to the housing by penetrating the drum center shaft. The path recess and the sector gear structure are distributed on opposite sides of the drum center shaft.

The main rotating member is a sector gear. A front end of the main rotating member is provided with a section of engaging teeth engaged with the swinging member. The main rotating member is located on one side of the swinging member. The swinging member and the main rotating member are coaxially arranged. The swinging member is rotatably connected to the housing.

Further, one side of the swinging member opposite the path recess is provided with a sector gear structure. The swinging member is rotatably connected to the housing by penetrating the drum center shaft. The path recess and the sector gear structure are distributed on opposite sides of the drum center shaft.

The main rotating member is a sector gear. A front end of the main rotating member is provided with a section of engaging teeth engaged with the swinging member. The main rotating member is located on one side of the swinging member. The swinging member and the main rotating member are coaxially arranged. The swinging member is rotatably connected to the housing.

Further, the take-up drum is provided with a circular recess having a depth. The swinging member, the first control member and the main rotating member that are rotatably connected to the housing are all located in the circular recess, a side wall of the circular recess is provided with one or more groups of limiting openings, and a front end of the main rotating member fits into the limiting opening on the take-up drum.

BRIEF DESCRIPTION OF THE DRAWINGS

The present disclosure will be further described below with reference to the accompanying drawings and examples. In the drawings.

DETAILED DESCRIPTION OF THE EMBODIMENTS

In order to understand technical features, objectives and effects of the present disclosure more clearly, specific embodiments of the present disclosure are described in detail with reference to accompanying drawings.

The description that a component is "fixed" or "arranged" on another component may indicate that the component may be directly or indirectly located on another component. When a component is considered to be "connected" to another component, the component may be directly or indirectly connected to another component.

Orientations or positions indicated by the terms such as "upper", "lower", "left", "right", "front", "rear", "vertical", "horizontal", "top", "bottom", "inside", and "outside" are orientations or positions shown in the accompanying drawings, are merely for facilitating description, and cannot be interpreted as limiting the technical solution. The terms such as "first" and "second" are for descriptive purposes only and are not to be construed as indicating or implying relative importance or implicitly specifying the number of technical features. "A plurality of" means two or more, unless expressly specified otherwise.

As shown in FIGS. 1-10, a data cable reel includes a housing 100. The housing 100 is internally provided with a winding wheel mechanism 200 and a winding control mechanism 300. The winding wheel mechanism 200 includes a take-up drum 210, a drum center shaft 220, and a rotating spring (not shown in the figure) arranged in the drum center shaft 220, and the rotating spring drives the drum center shaft 220 to rotate so as to take up a cable. The winding control mechanism 300 includes a main rotating member 310 fixedly connected to the winding wheel mechanism 200 and directly driving the winding wheel mechanism 200 to rotate, a swinging member 320 engaged with the main rotating member 310, a first control member 330 controlling movement of the swinging member 320, and a second control member 340 starting movement of the swinging member 320. The swinging member 320 and the first control member 330 are rotatably connected to the take-up drum 210 or the housing 100, and the second control member 340 is fixed on the take-up drum 210 or the housing 100. The swinging member 320 is provided with a motion path 321, the first control member 330 is used in the motion path 321 in a matching manner, and the swinging member 320 is controlled to rotate and stop according to a shape of the motion path 321 and a position of the first control member 330 in the motion path 321. The swinging member 320 elastically abuts against or is elastically connected to the second control member 340 when the swinging member 320 stops, and the movement of the swinging member 320 is started through an elastic force of the second control member 340.

Figure 1:
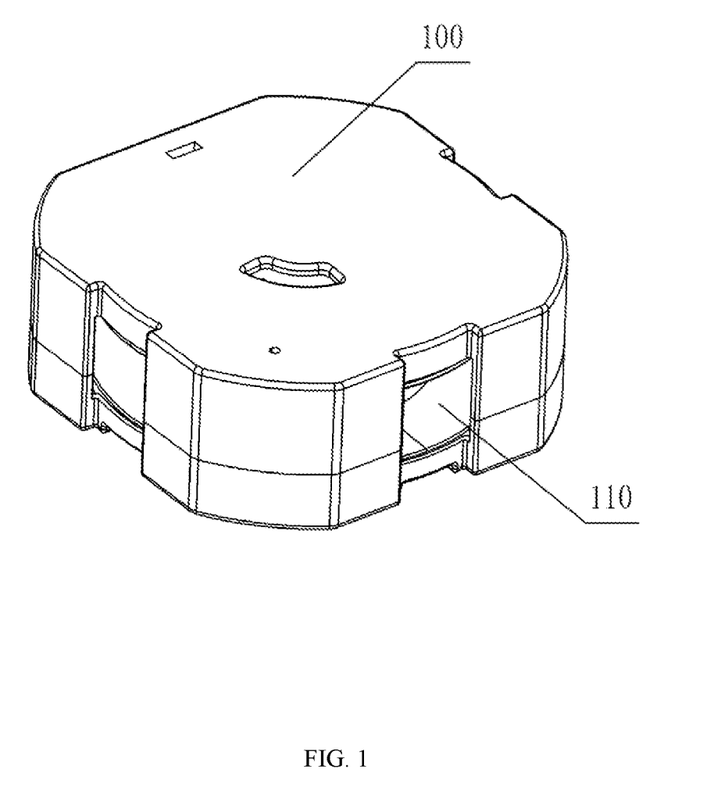
FIG. 1 is a schematic structural diagram of an appearance according to Example 1 of the present disclosure.
Figure 2:
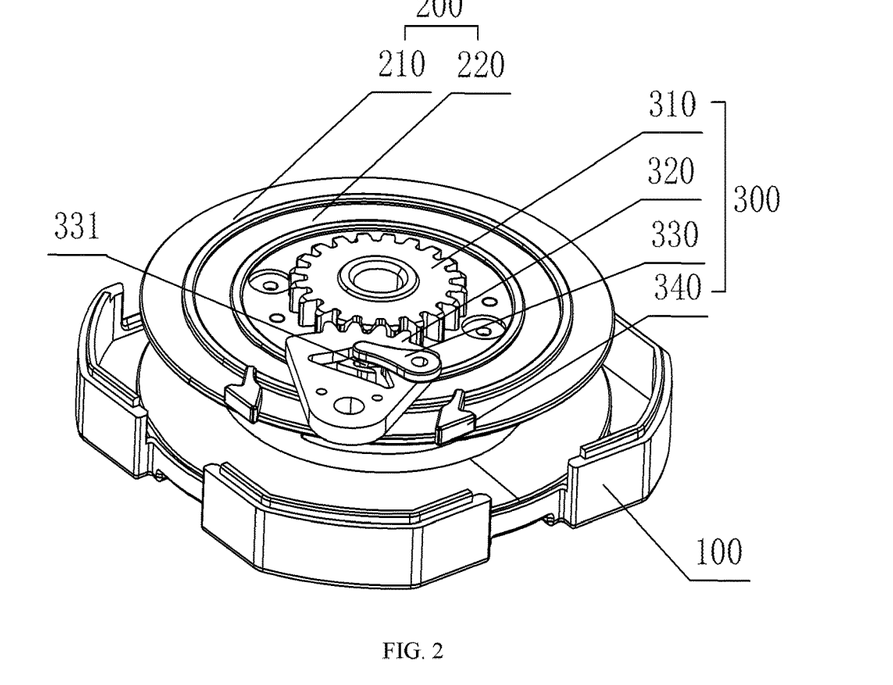
FIG. 2 is a schematic structural diagram of a matching relation between a winding wheel mechanism and a winding control mechanism according to Example 1 of the present disclosure.

The winding control mechanism 300 has a plurality of embodiments, and therefore is described in detail according to different embodiments as follows:

In Example 1, a data cable reel includes a housing 100. The housing 100 is internally provided with a winding wheel mechanism 200 and a winding control mechanism 300.

The housing 100 includes an upper housing 100 and a lower housing 100, which are fastened together to form a complete housing 100. A side surface of the housing 100 is provided with an in-out opening 110 allowing a data cable to enter and exit. A shape and a structure of the housing 100 may be designed according to different needs, which are not limited herein and only need to achieve a protective effect on the winding wheel mechanism 200 and the winding control mechanism 300.

A main function of the winding wheel mechanism 200 is to wind the data cable. The winding wheel mechanism 200 includes a take-up drum 210, a drum center shaft 220, and a rotating spring arranged in the drum center shaft 220. The take-up drum 210 is of a hollow structure or an I-shaped structure, and is configured to accommodate the data cable. A center of the take-up drum is provided with the drum center shaft 220. One end of the data cable is fixed on the drum center shaft 220. The rotating spring drives the drum center shaft 220 to rotate so as to take up a cable in the take-up drum 210. A specific structure is the same as that in the prior art, which will not be repeated herein.

The winding control mechanism 300 is arranged outside the winding wheel mechanism 200 and controls the winding wheel mechanism 200. The winding control mechanism 300 includes a main rotating member 310, a swinging member 320, a first control member 330, and a second control member 340 starting movement of the swinging member 320. In the example, the swinging member 320 is engaged with the main rotating member 310. Specifically, the main rotating member 310 is a gear coaxially fixed on the drum center shaft 220. The swinging member 320 is a sector gear. A front end of the swinging member 320 is provided with a section of engaging teeth engaged with the gear of the main rotating member 310. A rear end of the swinging member is rotatably connected to the take-up drum 210 or the housing 100.

Figure 3:
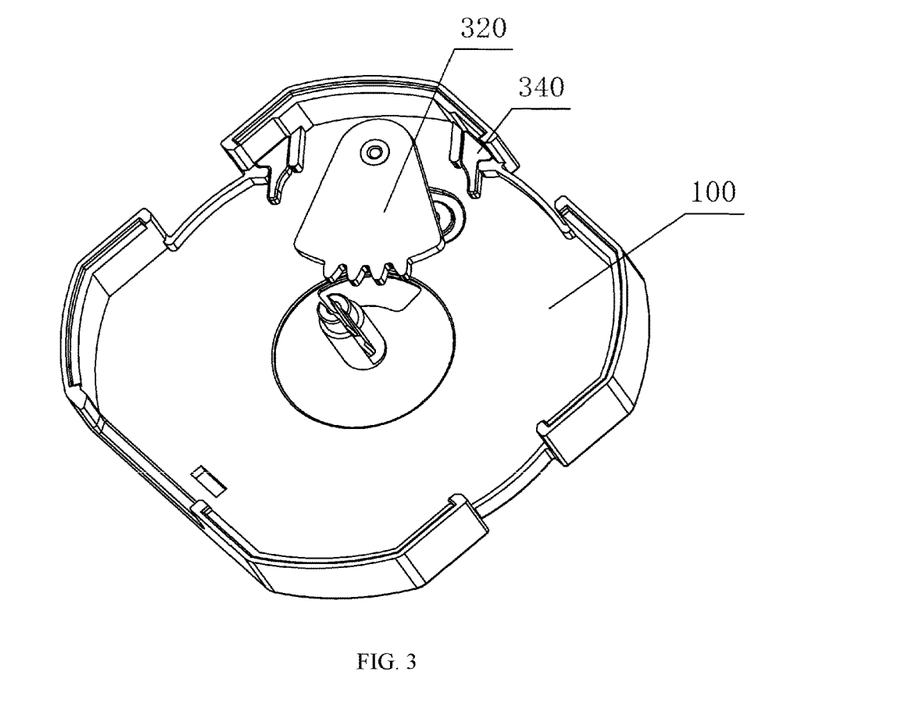
FIG. 3 is a schematic diagram of a fixing relation between a swinging member, a second control member and a housing according to Example 1 of the present disclosure.

The swinging member 320, the first control member 330 and the second control member 340 all need to be fixed and are connected to the main rotating member 310, which are fixed at two positions and in two ways as follows: one way is that the swinging member 320 and the first control member 330 are rotatably connected to the take-up drum 210, and the second control member 340 is fixed on the take-up drum 210; and another way is that the swinging member 320 and the first control member 330 are rotatably connected to the housing 100, and the second control member 340 is fixed on the housing 100. In the example, the way of fixation on the housing 100 is used. As shown in FIG. 3, the swinging member 320 is rotatably connected to the housing 100, and the second control members 340 are fixed on the housing 100 on two sides of the swinging member 320 by means of fixing blocks in a clamped manner.

Figure 4:
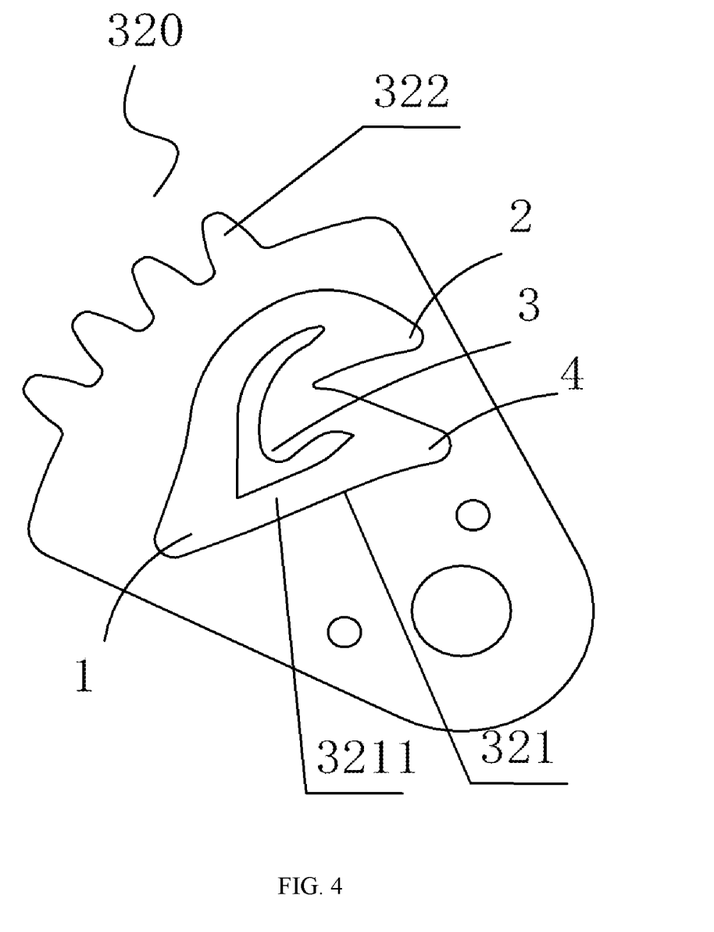
FIG. 4 is a schematic structural diagram of a swinging member according to Example 1 of the present disclosure.

The swinging member 320 is provided with a motion path 321. The first control member 330 is used in the motion path 321 in a matching manner. The swinging member 320 is controlled to rotate and stop according to a shape of the motion path 321 and a position of the first control member 330 in the motion path 321. The swinging member 320 elastically abuts against the second control member 340 when the swinging member 320 stops. The movement of the swinging member 320 is started through an elastic force of the second control member 340. As shown in FIG. 4, in the data cable reel, preferably, the motion path 321 is a path recess 3211 provided on the swinging member 320, the path recess 3211 is a closed ring recess, and the first control member 330 slides in the path recess 3211 in a matching manner. The path recess 3211 is provided with four fixed corners configured to stop the first control member 330, and the other parts of the path recess are non-obstacle slideways. The fixed corners are nodes where the data cable is retracted and released. A positional relation between the swinging member 320 and the main rotating member 310 is transformed at the nodes.

As shown in FIG. 4, a correspondence of the four fixed corners on the swinging member 320 is as follows: corner 1, corner 2 and corner 4 correspond to the condition that the swinging member 320 rotates to be in a non-engaged state with the main rotating member 310, and corner 3 corresponds to the condition that the swinging member 320 rotates to an edge and is in an engaged state with the main rotating member 310. The non-obstacle slideways achieve smooth transition with the corners, such that the closed ring recess is formed. In order to achieve smooth sliding, four fixed corners are the basis for determining the path recess 3211. A width, an extension direction and a shape of the path recess 3211 are determined in coordination with a swinging process of the swinging member 320, which is not limited herein. That is, a shape of the motion path 321 may be varied and is not limited to the shape of the example.

The second control members 340 are arranged in a pair and are located at rotation limiting points on two sides of the swinging member 320. When the swinging member 320 rotates to the rotation limiting point, the swinging member 320 is disengaged from the main rotating member 310 and elastically abuts against the second control members 340. The rotation limiting point refers to a maximum distance of swinging of the swinging member 320. The two rotation limiting points are positions where the swinging member 320 is just disengaged from the main rotating member 310. The second control member 340 is an elastic shifting block made of an elastic material, and is fixed on an inner wall of the housing 100 by means of a fixing block. The swinging member 320 may be pushed to a center through a counteracting force of the second control member 340.

The first control member 330 is a rotating plate rotatably connected to the inner wall of the housing 100. A front end of the rotating plate is provided with a convex column 331. The convex column 331 slides in the motion path 321 in a matching manner. The first control member 330 and the swinging member 320 cooperate with each other to complete control of retracting and releasing the data cable.

Figure 5:
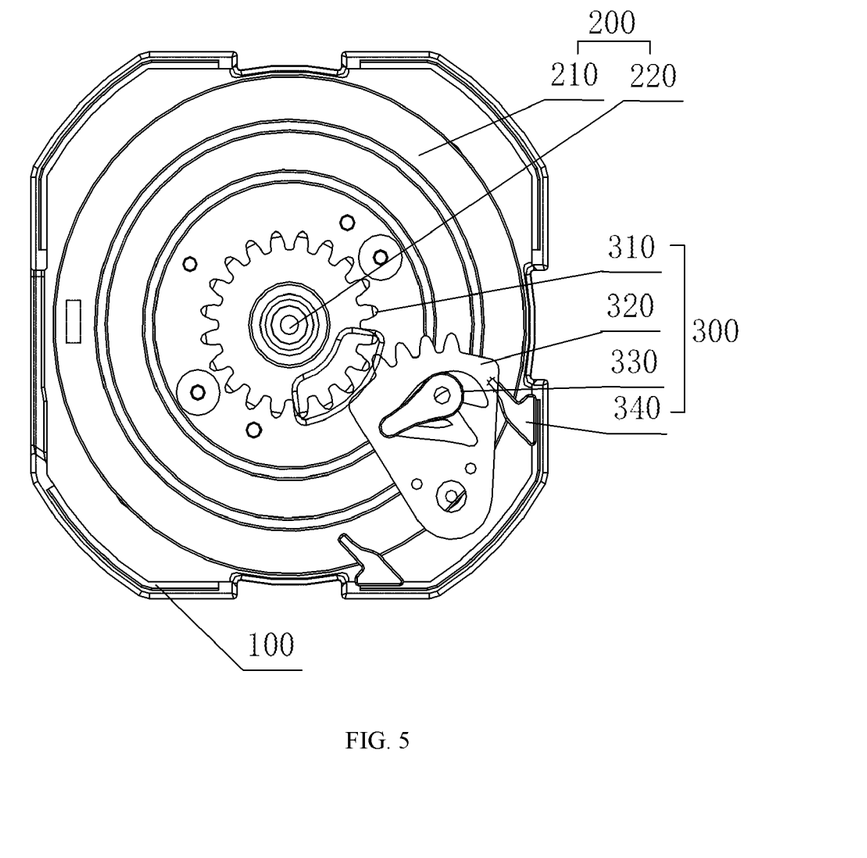
FIGS. 5-8 are schematic structural diagrams of four matching relations according to Example 1 of the present disclosure.

As shown in FIGS. 5-8, a cooperation process of the swinging member 320, the main rotating member 310, the first control member 330 and the second control member 340 is as follows: the data cable is completely accommodated in the take-up drum 210, and the first control member 330 slides in the path recess 3211 of the swinging member 320 to a position of the corner 1 as shown in FIG. 5. In this case, the swinging member 320 is not engaged with the main rotating member 310, and the main rotating member 310 may rotate infinitely counterclockwise. The position is an initial position. As the initial position, the position of the corner 1 is not limited to the position shown in FIG. 5, and may be set at other positions of the path recess 3211. In addition, in the entire closed ring recess, another corner may be set as the initial position.

Figure 6:
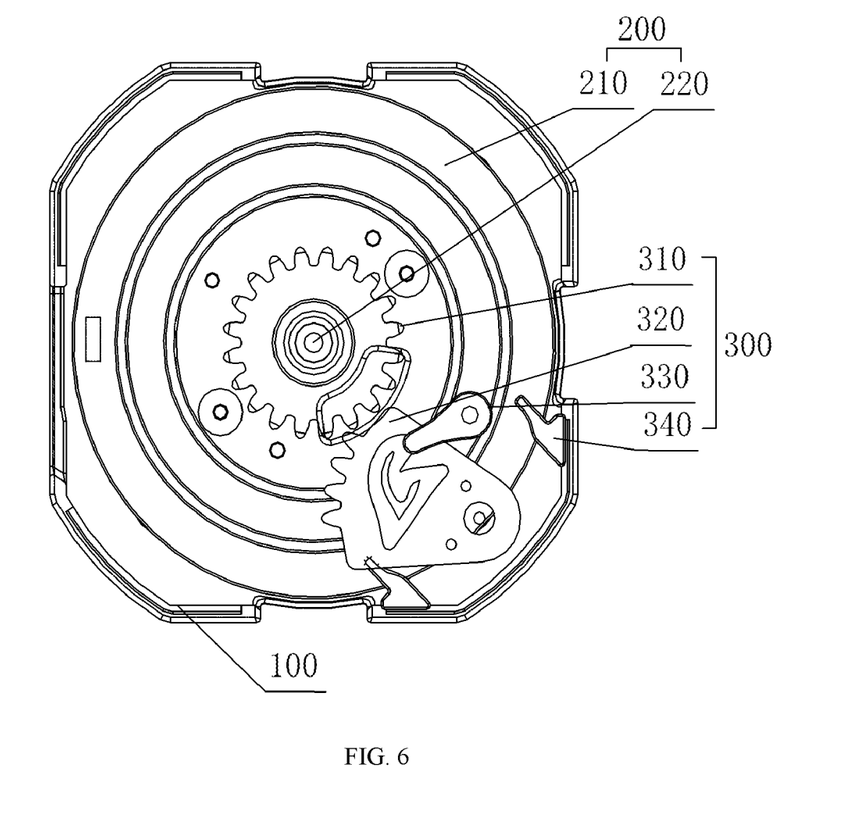

When the data cable is pulled out, the main rotating member 310 rotates clockwise, and drives the swinging member 320 to rotate counterclockwise. The first control member 330 slides in the path recess 3211 to a position of the corner 2 as shown in FIG. 6 (a sliding track of which is from the position of the corner 1 to the position of the corner 2). In this case, the teeth of the main rotating member 310 and the swinging member 320 are in a separated state, such that when the swinging member 320 is not rotating, the main rotating member 310 may continue to rotate so as to enable the data cable to be pulled out without stopping until the data cable is pulled to a proper length.

Figure 7:
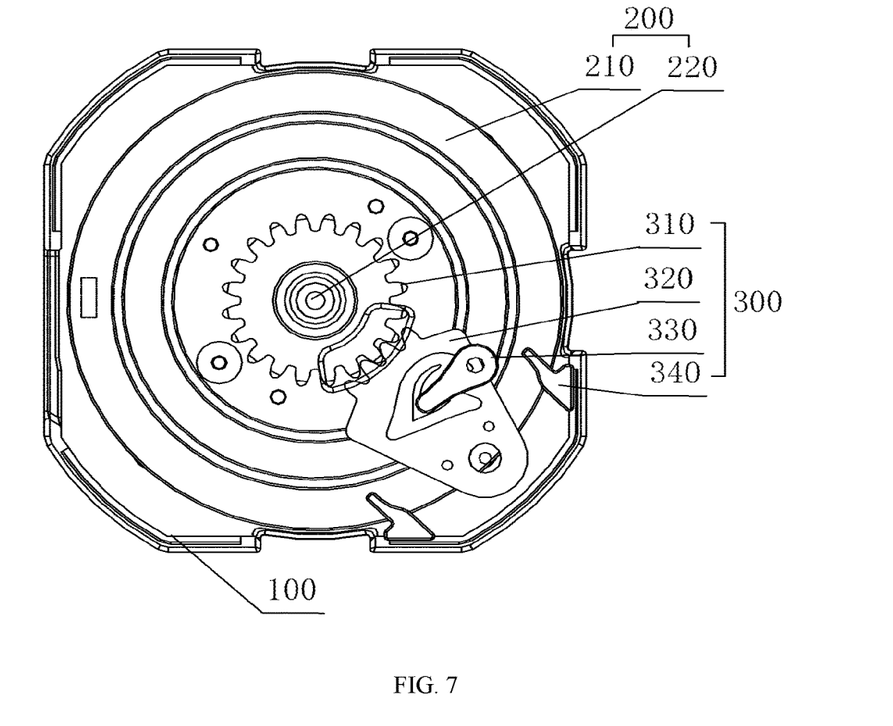

After the data cable is pulled to a proper length, pulling is stopped. The rotating spring in the drum center shaft 220 drives the drum center shaft to rotate, and further the main rotating member 310 is driven to rotate. The swinging member 320 is driven by the main rotating member 310 to rotate to the position of the corner 2 and then stop rotating. The main rotating member 310 may rotate reversely (that is, counterclockwise), and meanwhile, the second control member 340 applies a counter-acting force to the swinging member 320, such that the swinging member 320 is in an initial state of clockwise rotation. In this way, the main rotating member 310 is engaged with the gear of the swinging member 320, so as to drive the swinging member 320 to rotate clockwise. In this case, the first control member 330 slides in the path recess 3211 from the position of the corner 2 to a position of the corner 3 as shown in FIG. 7, and the swinging member 320 is stopped by the first control member 330 and cannot continue to rotate (clockwise). Meanwhile, the main rotating member 310 is locked and continues to rotate counterclockwise. In this way, the data cable is in a static state after being pulled to a required proper length.

Figure 8:
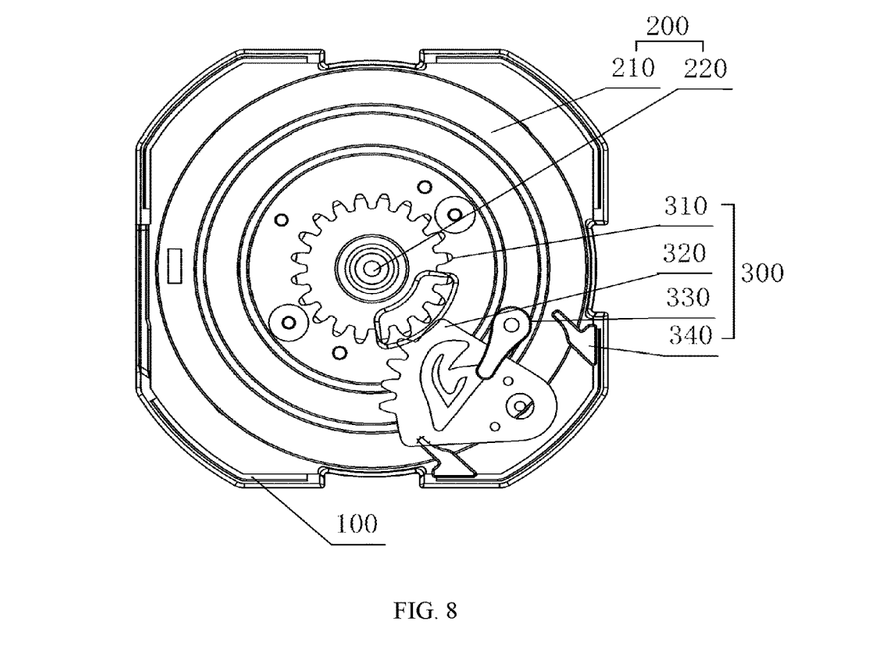

Then, the data cable is pulled, and the main rotating member 310 rotates clockwise again and drives the swinging member 320 to rotate counterclockwise. Meanwhile, the convex column 331 of the first control member 330 slides along the path recess 3211 from the position of the corner 3 to a position of the corner 4 as shown in FIG. 8 and then stops sliding. In this case, the teeth of the main rotating member 310 and the swinging member 320 are in a separated state, such that when the swinging member 320 is not rotating, the main rotating member 310 may continue to rotate so as to enable the data cable to be pulled out without stopping.

When pulling of the data cable stops and reverse rotation is required (the main rotating member 310 rotates counterclockwise), the second control member 340 applies a counter-acting force to the swinging member 320, such that the swinging member 320 is in an initial state of clockwise rotation. In this way, the main rotating member 310 is engaged with the gear of the swinging member 320, so as to drive the swinging member 320 to rotate clockwise. The first control member 330 slides in the path recess 3211 from the position of the corner 4 to the position of the corner 1. In this case, the teeth of the main rotating member 310 and the swinging member 320 are in a separated state, such that when the swinging member 320 is not rotating, the main rotating member 310 may continue to rotate so as to enable the data cable to be stored without stopping until the data cable is completely stored.

Figure 9:
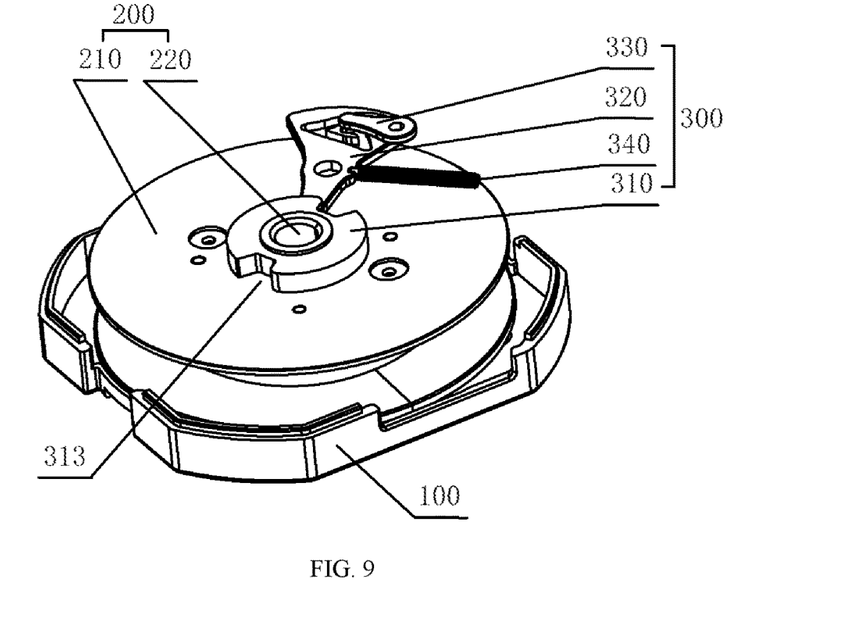
FIG. 9 is a schematic structural diagram of a matching relation between a winding wheel mechanism and a winding control mechanism according to Example 2 of the present disclosure.
Figure 10:
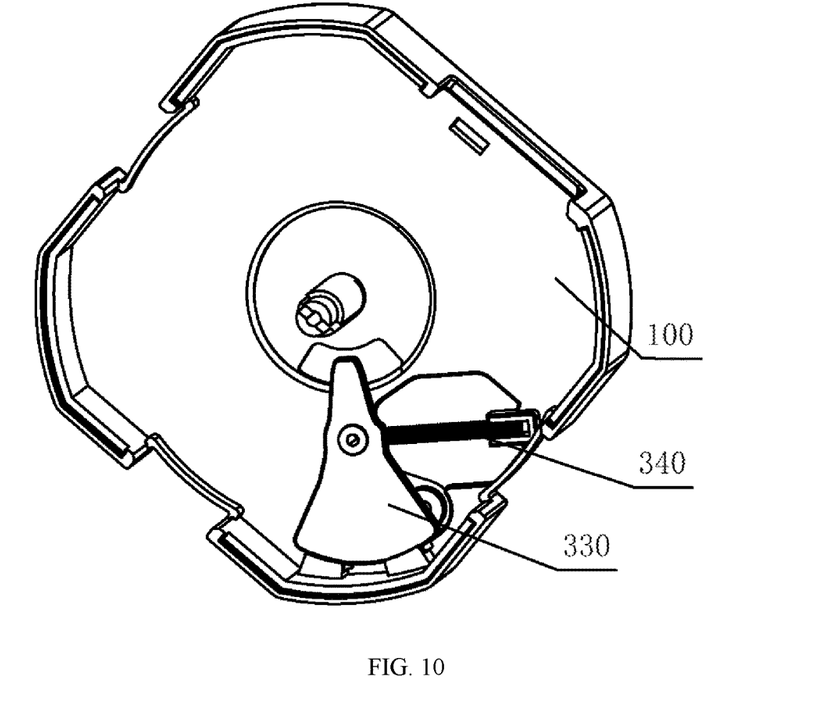
FIG. 10 is a schematic diagram of a fixing relation between a swinging member, a second control member and a housing according to Example 2 of the present disclosure.

In Example 2, as shown in FIGS. 9-10, the example shows improvements made on the basis of Example 1.

One improvement is that the main rotating member 310 is an open-end disc coaxially fixed on the drum center shaft 220, and the open-end disc is provided with at least one toggle notch 313; and the swinging member 320 is sectorial, a front end of the swinging member matches the toggle notch 313 of the open-end disc, and a rear end of the swinging member is rotatably connected to an inner wall of the housing 100. The open-end disc is a circular disc. An edge of the open-end disc is provided with at least one toggle notch 313. A length of the toggle notch 313 and the number of the toggle notches 313 match the motion path 321 of the swinging member 320 separately.

Another improvement is that the second control member 340 is a spring, one end of the spring is fixed on the swinging member 320, the other end of the spring is fixed on the take-up drum 210 or the housing 100, the second control member 340 is arranged on one side of the swinging member 320 separately, and a function of the spring is to start and reset the swinging member 320. In order to achieve the function, a connection position of the spring is a position of a side surface of the swinging member 320 close to a rotating shaft.

The other parts of the structure are the same as those of Example 1. Especially the motion path 321 provided on the swinging member 320 is the same as that of Example 1. A cooperation process of the swinging member 320, the main rotating member 310, the first control member 330 and the second control member 340 is implemented as follows:

The data cable is completely accommodated in the take-up drum 210, and the first control member 330 slides in the path recess 3211 of the swinging member 320 to a position of the corner 1. In this case, the swinging member 320 is not engaged with the main rotating member 310 (in the example, "engage" indicates that a front end of the swinging member 320 is inserted into and abuts against the toggle notch 313, which is consistent in the following description). The main rotating member 310 may rotate infinitely counterclockwise. The position is an initial position. In this case, the spring of the second control member 340 is in a compressed state.

When the data cable is pulled out, the main rotating member 310 rotates clock wise, and the spring of the second control member 340 drives the swinging member 320 to rotate counterclockwise. The first control member 330 slides in the path recess 3211 to a position of the corner 2 (a sliding track of which is from the position of the corner 1 to the position of the corner 2). In this case, the main rotating member 310 and the swinging member 320 are still in a non-engaged and separated state (a front end of the swinging member 320 only abuts against the edge of the open-end disc of the main rotating member 310), such that the main rotating member 310 may continue to rotate so as to enable the data cable to be pulled out without stopping until the data cable is pulled to a proper length.

After the data cable is pulled to a proper length, pulling is stopped. The rotating spring in the drum center shaft 220 drives the drum center shaft to rotate, and further the main rotating member 310 is driven to rotate. When the spring of the second control member 340 drives the swinging member 320 to rotate to the position of the corner 2, the front end of the swinging member 320 starts to be inserted into and engaged with the toggle notch 313, and the main rotating member 310 may rotate reversely (that is, counterclockwise), such that the swinging member 320 rotates clockwise. In this case, the first control member 330 slides in the path recess 3211 from the position of the corner 2 to a position of the corner 3, and the swinging member 320 is stopped by the first control member 330 and cannot continue to rotate (clockwise). Meanwhile, the main rotating member 310 is locked and continues to rotate counterclockwise. In this way, the data cable is in a static state after being pulled to a required proper length.

Then, the data cable is pulled, and the main rotating member 310 rotates clockwise again and drives the swinging member 320 to rotate counterclockwise, and the front end of the swinging member 320 is disengaged from the toggle notch 313. Meanwhile, the convex column 331 of the first control member 330 slides along the path recess 3211 from the position of the corner 3 to a position of the corner 4 and then stops sliding. In this case, when the swinging member 320 is not rotating, the main rotating member 310 may continue to rotate so as to enable the data cable to be pulled out without stopping.

When pulling of the data cable stops and reverse rotation is required (the main rotating member 310 rotates counterclockwise), the second control member 340 applies a counter-acting force to the swinging member 320, such that the swinging member 320 is in an initial state of clockwise rotation. The first control member 330 slides in the path recess 3211 from the position of the corner 4 to the position of the corner 1. In this case, the main rotating member 310 and the swinging member 320 are in a separated (non-engaged) state, such that the main rotating member 310 may continue to rotate so as to enable the data cable to be stored without stopping until the data cable is completely stored.

Figure 11:
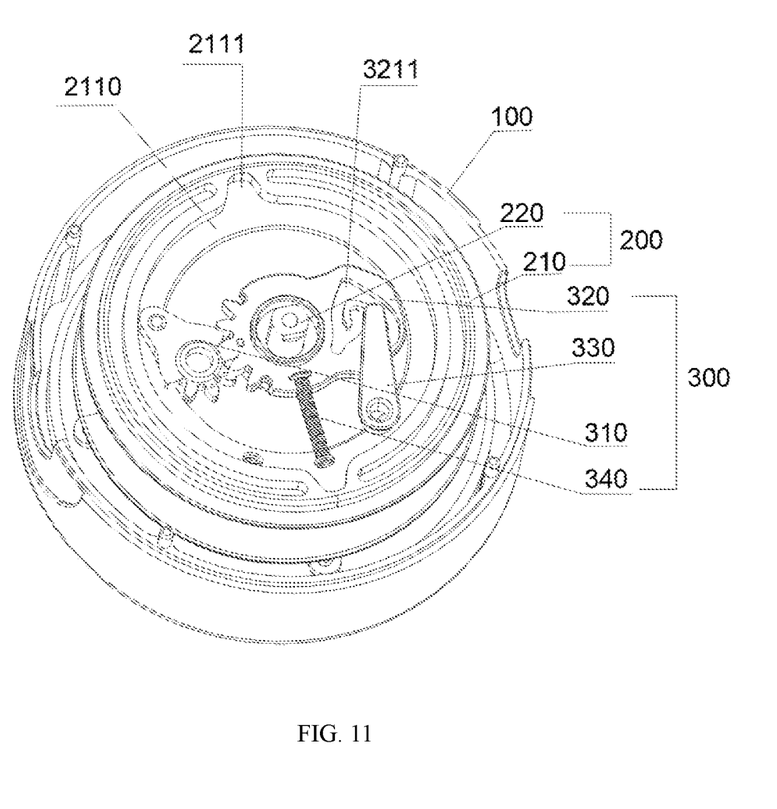
FIG. 11 is a schematic diagram of an internal structure according to Example 3 of the present disclosure.
Figure 12:
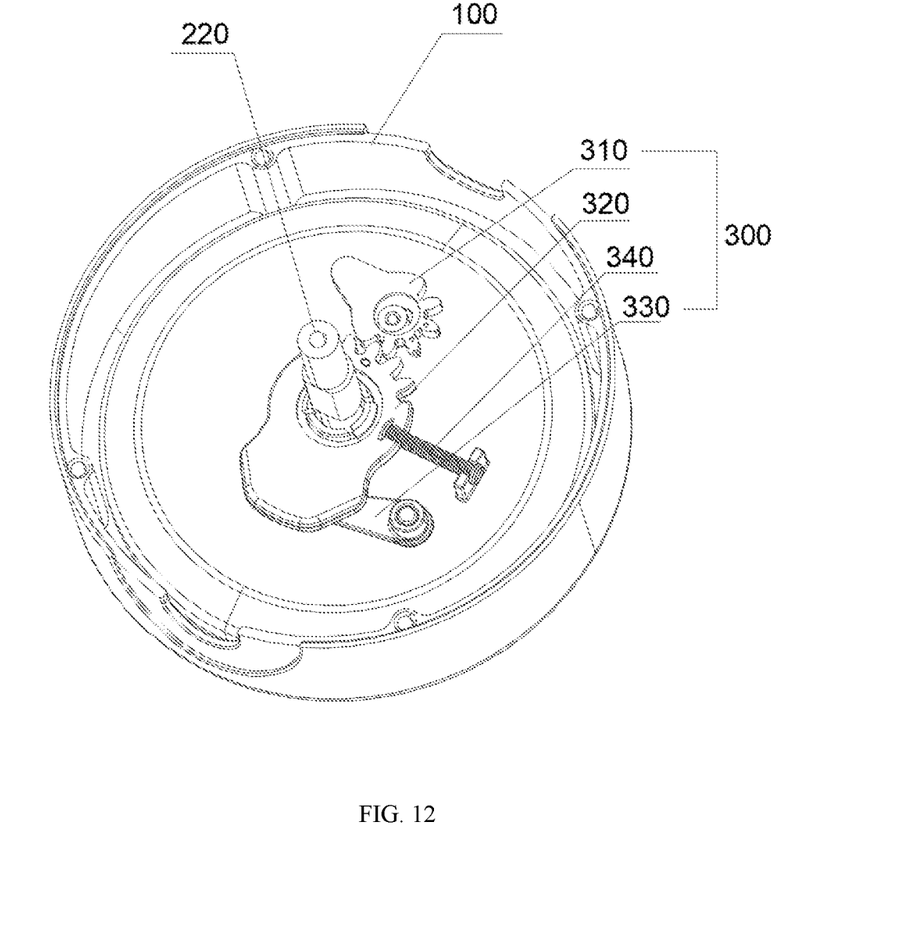
FIG. 12 is a schematic diagram of a fixing relation between a swinging member, a rotating member, a first control member and a housing according to Example 3 of the present disclosure.

In Example 3, as shown in FIGS. 11-12, the example shows improvements made on the basis of Example 1 and Example 2.

One improvement is that the swinging member 320, the first control member 330 and the main rotating member 310 are all arranged on the housing 100, the swinging member 320 is provided with a path recess 3211, a shape and a structure of the path recess 3211 are the same as those of the path recess 3211 in Example 1, the convex column 331 on the first control member 330 slides in the path recess 3211 in a matching manner, and the first control member 330 is rotatably connected to one side of the main rotating member 310.

In this way, the motion path 321 on the swinging member 320 in the example is the same as the motion path 321 in Example 1 and Example 2, and the examples are consistent in a sliding track and a working principle of the convex column 331 on the first control member 330 in the path recess 3211, which will not be described in detail herein.

Another improvement is that one side of the swinging member 320 opposite the path recess 3211 is provided with a sector gear structure, the swinging member 320 is rotatably connected to the housing 100 by penetrating the drum center shaft 220, and the path recess 3211 and the sector gear structure are distributed on opposite sides of the drum center shaft 220.

The main rotating member 310 is a sector gear. A front end of the main rotating member is provided with a section of engaging teeth engaged with the swinging member. The main rotating member 310 is located on one side of the swinging member 320. The swinging member 320 and the main rotating member 310 are coaxially arranged. The swinging member 320 is rotatably connected to the housing 100. In the example, the second control member 340 is a spring. One end of the spring of the second control member 340 is fixedly connected to the swinging member 320, and the other end of the spring is fixed on the housing 100.

The take-up drum 210 is provided with a circular recess 2110 having a depth. The swinging member 320, the first control member 330 and the main rotating member 310 that are rotatably connected to the housing 100 are all located in the circular recess 2110. A side wall of the circular recess 2110 is provided with one or more groups of limiting openings 2111. A front end of the main rotating member 310 matches the limiting opening 2111 on the take-up drum 210.

The other parts of the structure are the same as those of Example 1 and Example 2. Especially the motion path 321 provided on the swinging member 320 is the same as that of Example 1 and Example 2. A cooperation process of the swinging member 320, the main rotating member 310, the first control member 330 and the second control member 340 is implemented as follows:

The data cable is completely accommodated in the take-up drum 210, and the first control member 330 slides in the path recess 3211 of the swinging member 320 to a position of the corner 1. In this case, the swinging member 320 is not engaged with the main rotating member 310 (in the example, "engage" indicates that a front end of the swinging member 320 is inserted into and abuts against the toggle notch 313, which is consistent in the following description). The main rotating member 310 may rotate infinitely counterclockwise. The position is an initial position. In this case, the spring of the second control member 340 is in a compressed state.

When the data cable is pulled out, the main rotating member 310 rotates clockwise, and the spring of the second control member 340 drives the swinging member 320 to rotate counterclockwise. The first control member 330 slides in the path recess 3211 to a position of the corner 2 (a sliding track of which is from the position of the corner 1 to the position of the corner 2). In this case, the main rotating member 310 and the swinging member 320 are still in a non-engaged and separated state (a front end of the swinging member 320 only abuts against the edge of the open-end disc of the main rotating member 310), such that the main rotating member 310 may continue to rotate so as to enable the data cable to be pulled out without stopping until the data cable is pulled to a proper length.

After the data cable is pulled to a proper length, pulling is stopped. The rotating spring in the drum center shaft 220 drives the drum center shaft to rotate, and further the main rotating member 310 is driven to rotate. When the spring of the second control member 340 drives the swinging member 320 to rotate to the position of the corner 2, the front end of the swinging member 320 starts to be inserted into and engaged with the limiting opening 2111, and the main rotating member 310 may rotate reversely (that is, counter-clockwise), such that the swinging member 320 rotates clockwise. In this case, the first control member 330 slides in the path recess 3211 from the position of the corner 2 to a position of the corner 3, and the swinging member 320 is stopped by the first control member 330 and cannot continue to rotate (clockwise). Meanwhile, the main rotating member 310 is locked and continues to rotate counterclockwise. In this way, the data cable is in a static state after being pulled to a required proper length.

Then, the data cable is pulled, the main rotating member 310 rotates clockwise again and drives the swinging member 320 to rotate counterclockwise, and the front end of the swinging member 320 is disengaged from the limiting opening 2111. Meanwhile, the convex column 331 of the first control member 330 slides along the path recess 3211 from the position of the corner 3 to a position of the corner 4 and then stops sliding. In this case, when the swinging member 320 is not rotating, the main rotating member 310 may continue to rotate so as to enable the data cable to be pulled out without stopping.

When pulling of the data cable stops and reverse rotation is required (the main rotating member 310 rotates counter-clockwise), the second control member 340 applies a counter-acting force to the swinging member 320, such that the swinging member 320 is in an initial state of clockwise rotation. The first control member 330 slides in the path recess 3211 from the position of the corner 4 to the position of the corner 1. In this case, the main rotating member 310 and the swinging member 320 are in a separated (non-engaged) state, such that the main rotating member 310 may continue to rotate so as to enable the data cable to be stored without stopping until the data cable is completely stored.

The invention claimed is:

1. A data cable reel, comprising a housing, wherein the housing is internally provided with a winding wheel mechanism and a winding control mechanism;

the winding wheel mechanism comprises a take-up drum, a drum center shaft, and a rotating spring arranged in the drum center shaft, and the rotating spring drives the drum center shaft to rotate so as to take up a cable;

the winding control mechanism comprises a main rotating member fixedly connected to the winding wheel mechanism and directly driving the winding wheel mechanism to rotate, a swinging member engaged with the main rotating member, a first control member controlling a movement of the swinging member, and a second control member starting the movement of the swinging member;

the swinging member and the first control member are rotatably connected to the take-up drum or the housing, and the second control member is fixed on the take-up drum or the housing;

the swinging member is provided with a motion path, and the swinging member is controlled to rotate and stop according to a shape of the motion path and a position of the first control member in the motion path; and the swinging member elastically abuts against or is elastically connected to the second control member when the swinging member stops, and the movement of the swinging member is started through an elastic force of the second control member;

wherein the motion path is a path recess formed on the swinging member, the path recess is a closed ring recess or a non-closed ring recess, and the first control member slides in the path recess; and the first control member is a rotating plate rotatably connected to the take-up drum or the housing, a front end of the rotating plate is provided with a convex column, and the convex column slides in the motion path.

2. The data cable reel according to claim 1, wherein the path recess is provided with at least four fixed corners configured to stop the first control member, the other parts of the path recess are non-obstacle slideways, a correspondence of the four fixed corners is as follows: a first corner (1), a second corner (2) and a fourth corner (4) correspond to a condition that the swinging member rotates to be in a non-engaged state with the main rotating member, and a third corner (3) corresponds to a condition that the swinging member rotates to a middle position and is in an engaged state with the main rotating member.

3. The data cable reel according to claim 1, wherein the second control members are arranged in a pair and are located at rotation limiting points on two sides of the swinging member, and when the swinging member rotates to the rotation limiting points, the swinging member is disengaged from the main rotating member and elastically abuts against the second control members; and alternatively, the second control member is fixed on one side of the swinging member and connected to the swinging member, and when the swinging member rotates to a rotation limiting point, the swinging member is disengaged from the main rotating member, and the second control member is elastically compressed; and the second control member is an elastic shifting block made of plastic or metal having certain resilience.

4. The data cable reel according to claim 1, wherein the main rotating member is a gear coaxially fixed on the drum center shaft; and the swinging member is a sector gear, a front end of the swinging member is provided with a section of engaging teeth engaged with the main rotating member, and a rear end of the swinging member is rotatably connected to the take-up drum or the housing.

5. The data cable reel according to claim 1, wherein the main rotating member is an open-end disc coaxially fixed on the drum center shaft, and the open-end disc is provided with at least one toggle notch; and the swinging member is sectorial, a front end of the swinging member matches the toggle notch of the open-end disc, and a middle portion of the swinging member is rotatably connected to the take-up drum or the housing.

6. The data cable reel according to claim 1, wherein the second control member is a spring, one end of the spring is fixed on the swinging member or the main rotating member, the other end of the spring is fixed on the take-up drum or the housing, and the second control member is separately arranged on one side of the swinging member.

7. The data cable reel according to claim 1, wherein the swinging member, the first control member and the main rotating member are all arranged on the housing, the swinging member is provided with a path recess, a convex column on the first control member slides in the path recess in a matching manner, and the first control member is rotatably connected to one side of the main rotating member.

8. The data cable reel according to claim 1, wherein one side of the swinging member opposite the path recess is provided with a sector gear structure, the swinging member is rotatably connected to the housing by penetrating the drum center shaft, and the path recess and the sector gear structure are distributed on opposite sides of the drum center shaft; and the main rotating member is a sector gear, a front end of the main rotating member is provided with a section of engaging teeth engaged with the swinging member, the main rotating member is located on one side of the swinging member, the swinging member and the main rotating member are coaxially arranged, and the swinging member is rotatably connected to the housing.

9. The data cable reel according to claim 1, wherein the take-up drum is provided with a circular recess having a depth, and the swinging member, the first control member and the main rotating member that are rotatably connected to the housing are all located in the circular recess, a side wall of the circular recess is provided with one or more groups of limiting openings, and a front end of the main rotating member matches the limiting opening on the take-up drum.

* * * * *